United States Patent [19]

Ojima et al.

[11] Patent Number: 4,571,650
[45] Date of Patent: Feb. 18, 1986

[54] MAGNETO-OPTIC INFORMATION STORAGE SYSTEM UTILIZING A SELF-COUPLED LASER

[75] Inventors: Masahiro Ojima; Toshio Niihara, both of Kokubunji; Hideo Fujiwara, Tokorozawa, all of Japan

[73] Assignee: Hitachi, Ltd., Tokyo, Japan

[21] Appl. No.: 529,679

[22] Filed: Sep. 6, 1983

[30] Foreign Application Priority Data

Sep. 7, 1982 [JP] Japan ................. 57-156142

[51] Int. Cl.[4] .................. G11B 7/00; G11B 11/00
[52] U.S. Cl. .................. 360/114; 369/13; 369/110; 365/122
[58] Field of Search .......... 369/13, 14, 43, 44, 369/45, 46, 110, 100, 121, 275; 360/59, 114; 365/121, 122

[56] References Cited

U.S. PATENT DOCUMENTS 4,410,277 10/1983 Yamamoto et al. ........ 360/114 X
4,451,863 5/1984 Yanagida et al. ........ 369/13 X

FOREIGN PATENT DOCUMENTS 191148 11/1982 Japan ................. 369/13

Primary Examiner—Robert L. Richardson
Attorney, Agent, or Firm—Antonelli, Terry & Wands

[57] ABSTRACT

An optical information storage system wherein information is read from a magneto-optical storage medium by indicating the storage medium with a first laser beam generated by a semiconductor laser and exploiting the self-coupling effect of the semiconductor laser in response to light reflected from the storage medium to generate a second laser beam. A Faraday rotator is disposed in an optical path along which the reflected light from the magneto-optical storage medium returns to the semiconductor laser and a polarization rotating angle of the Faraday rotator is selected so that the oscillating polarization plane of the semiconductor laser is changeable in dependence upon the perpendicular magnetization direction of the magneto-optical storage medium. A linear polarizer is interposed between the semiconductor laser and a photodetector to extract from the second laser beam at least one polarization component parallel or perpendicular to a junction plane of the semiconductor laser with the extracted component being detected by the photodetector.

20 Claims, 8 Drawing Figures

MAGNETO-OPTIC INFORMATION STORAGE SYSTEM UTILIZING A SELF-COUPLED LASER

BACKGROUND OF THE INVENTION

The present invention relates to a system for optical information storage, and more particularly to an erasable system for optical information storage in which information is read from a magneto-optical recording medium by employing a semiconductor laser as a light source.

An erasable apparatus for optical information storage may be in the form of a magneto-optical disk memory which uses a perpendicularly magnetizable film as a storage medium. In such an apparatus, the storage medium is irradiated with a focused laser beam so as to invert the direction of magnetization thereof by absorbing the photon energy of the laser beam so as to record and erase information with the rotation of the polarization plane of light reflected from the storage medium being detected so as to reproduce information (Y. TOGAMI et al, "Amorphous thin film disk for magneto-optical memory", SPIE, Vol. 329, Optical Disk Technology (1982). pp. 208-214). With the magneto-optical storage apparatus of this type, the rotation power of the magnetizable film for the polarization plane is very low, for example, below 1° in terms of an angle. This leads to the serious problem of the S/N (signal-to-noise) ratio of a reproduced signal being too small for realization of a high-speed readout.

On the other hand, an optical disk memory having a good S/N ratio may be in the form of an optical disk memory of the type which is used only for reproduction or the type which is capable of recording and reproduction, but is incapable of erasure and rerecording. The reproduction in the optical disk memory of this type is based on detecting the magnitude of the intensity of reflected light from the disk. When employing a semiconductor laser as a light source, it is also possible to reproduce information by exploiting the so-called self-coupling effect which is a phenomenon wherein, when the reflected light from the disk is returned to the semiconductor laser, the optical output of the laser changes depending upon the magnitude of the intensity of the reflected light. Moreover, the use of the semiconductor laser as the light source is very advantageous for rendering the apparatus small in size and light in weight as well as in lowering the cost thereof.

An example of such an information reproducing apparatus which utilizes the self-coupling effect of the semiconductor laser is disclosed in Japanese Laid-open Patent Application No. 51-126846. In this apparatus, the magnitude of the intensity of the reflected light from the disk is converted into the magnitude of a backward emergent light of the semiconductor laser. Therefore, information is reproduced by a photodetector which is disposed behind the laser. In this apparatus, the polarization of the forward emergent light of the laser onto the disk is a TE (Transverse Electric) polarization which is parallel to the plane of a p-n junction, and also the polarization of the reflected light from the disk, as well as the backward emergent light of the laser is a TE polarization. Such an apparatus, however, merely operates to read recorded information and cannot operate to erase the information and record new information.

Recently apparatuses have been proposed which read information from an erasable storage medium in the form of a magneto-optic recording medium with utilization of the self-coupling effect. However, the rotation of a polarization plane by the magnetization of the magnetic film is slight, and a satisfactory S/N ratio of a reproduced signal has not been attained.

For example, Japanese Laid-open Patent Application No. 56-94530 discloses a reproducing apparatus wherein a double refractive material such as λ/4 plate is disposed in an optical path along which reflected light from the magneto-optic storage medium returns to a semiconductor laser, and wherein an angle defined between the optical axis of the λ/4 plate and the polarization plane of irradiating laser light is selected so that the oscillation mode of the semiconductor laser is changeable between a single oscillation mode and a multiple oscillation mode, depending upon the state of the magnetization of the storage medium.

In this regard, however, whether the semiconductor laser fed back with the reflected light effects the single mode oscillation or the multi-mode oscillation depends upon the quantity of the reflected light, the distance from the laser to the point of reflection, the temperature of the laser and the driving current of the laser, and it is particularly susceptible to changes in the distance between the laser and the medium. Accordingly, it is virtually impossible to detect the sense of the magnetization on the basis of the change in the oscillation modes.

In addition, Japanese Laid-open Patent Application No. 56-16950 discloses a reproducing apparatus wherein a Faraday rotation device is disposed in an optical path along which reflected light from a magneto-optic storage medium returns to a semiconductor laser. This apparatus exploits the phenomenon that the optical output intensity of the semiconductor laser changes sinusoidally, depending upon the rotation of the polarization plane of the reflected light fed back to the laser. In this apparatus, like the aforedescribed apparatus of Japanese Laid-open Patent Application No. 51-126846, the polarization of the forward emergent light of the laser (irradiating beam) is the TE polarization, and also the polarization of the reflected light from the storage medium, as well as the backward emergent light of the laser (reproducing beam) is the TE polarization. That is, the oscillating polarization direction of the semiconductor laser does not change.

Moreover, since the rotational angle of the polarization plane by the magneto-optical storage medium is as small as less than 1°, that variation of the optical output of the laser which corresponds to the change of the sense of the magnetization of the backward emergent light of the laser is slight. Accordingly, the S/N ratio of a reproduced signal is very low.

SUMMARY OF THE INVENTION

It is an object of the present invention to eliminate the problems in the prior optical information storage apparatuses as described above.

It is another object of the present invention to provide an optical information storage system which enables reproduction of information with a high S/N ratio from an erasable information storage medium such as a magnetically anisotropic storage medium.

In accordance with the present invention, there is provided an optical information storage system utilizing a semiconductor laser for transmitting light onto a magneto-optical storage medium with a Faraday rotator being disposed in an optical path along which reflected light from the magneto-optical storage medium returns to the semiconductor laser, a Faraday rotator having a polarization rotating angle which is set so that the polarization plane of backward emergent light of the semiconductor laser is changeable depending upon the direction of magnetization of the magnetooptical storage medium; and an analyzer having a polarization transmitting plane which is set to be parallel or perpendicular to the junction plane of the semiconductor laser is disposed in the optical path of the backward emergent light, whereby light transmitted through the analyzer is received by a photodetector.

The present invention will be apparent from the following detailed description taken in conjunction with the accompanying drawings, in which:

DESCRIPTION OF THE PREFERRED EMBODIMENTS

Figure 1:
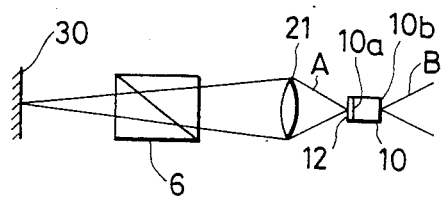
FIG. 1 illustrates an arrangement for explaining the operating principle upon which the present invention is based.

FIG. 1 is a schematic view for explaining the principle on which the present invention is based. In the illustrated arrangement, the polarization direction of a semiconductor laser 10 is changed by the polarizing characteristic of an external optical system. One facet 10a of the semiconductor laser 10 having a buried heterostructure is provided with an antireflection coating and a linear polarizer 6 is inserted between a coupling lens 21 and an external mirror 30. The linear polarizer 6 is rotated, whereby the polarization direction of reflected light returning to the semiconductor laser 10 is changed so as to change the polarizing characteristic of the external optical system.

More specifically, a forward laser beam A emergent from the facet 10a of the semiconductor laser 10 is projected onto the mirror 30 through the coupling lens 21 and the linear polarizer 6, and the reflected light from the reflector 30 is sent back to the emergent facet 10a through the linear polarizer 6 and the coupling lens 21 again. At this time, the semiconductor laser 10 and the external mirror 30 constitute an external resonator, the polarizing characteristic of which is changed by rotating the linear polarizer 6.

Here, the provision of the antireflection coating 12 on the facet 10a of the semiconductor laser 10 is intended to weaken the linear polarization selectively of the semiconductor laser device itself in the TE polarization direction and to render the laser device sensitive to the polarizing characteristic of the external resonator.

Figure 2A:
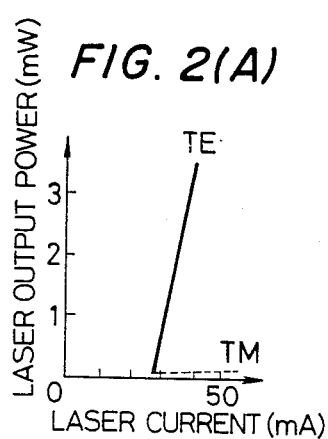
FIGS. 2(A)-2(c) are graphs illustrating the variations of laser oscillation light output power versus laser driving current for explaining the principle of the present invention.
Figure 2B:
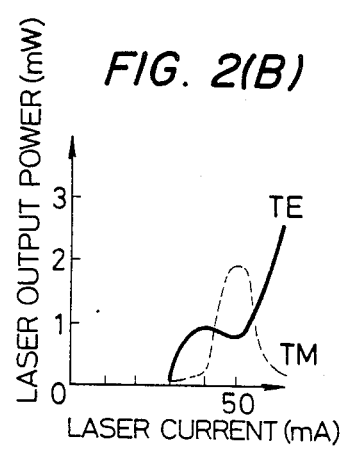
Figure 2C:
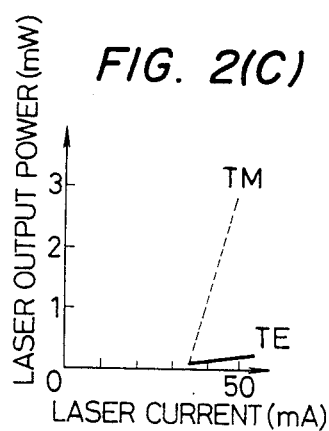

In the arrangement of FIG. 1, the laser driving current-dependencies of the TE polarization component and TM (Transverse Magnetic) polarization component, the polarization plane of which differs by 90° from that of the TE polarization, of a backward laser beam B emergent from the facet 10b of the semiconductor laser 10 become as illustrated in FIGS. 2(A)-2(C), depending upon the inclination of the polarization transmitting plane of the linear polarizer 6. In each of the graphs of these figures, the ordinates represent the laser optical output and the abscissas represent the driving current with the TE polarization component being shown in solid line and the TM polarization component being shown in broken line. FIG. 2(A) illustrates a case where the polarization transmitting plane of the linear polarizer 6 is in agreement with the TE polarization plane. At this time, the backward emergent light of the laser is naturally oscillating as the TE polarization. FIG. 2(C) illustrates a case where the polarizer 6 is rotated 90° so as to transmit only the TM polarization. At this time, the laser is oscillating as the TM polarization. FIG. 2(B) illustrates a case where the polarizer 6 is rotated by a predetermined angle, for example, 67.5° with respect to the TE polarization plane. This case establishes the situation in which, depending upon the laser driving current, the TE polarization increases or the TM polarization increases. It is understood from FIGS. 2(A)-2(C) that the polarization state of the semiconductor laser can be controlled by rotating the linear polarizer 6.

A proposed apparatus for polarization modulation exploiting this phenomenon is disclosed in Japanese Laid-open Utility Model Registration Application No. 56-2265. This polarization modulator is such that the linear polarizer is mechanically rotated by an electromagnetic rotator so as to rotate the polarization plane to-be-transmitted, whereby the polarization state of a backward laser oscillation beam is changed from the TE polarization to the TM polarization, or vice versa.

Figure 3:
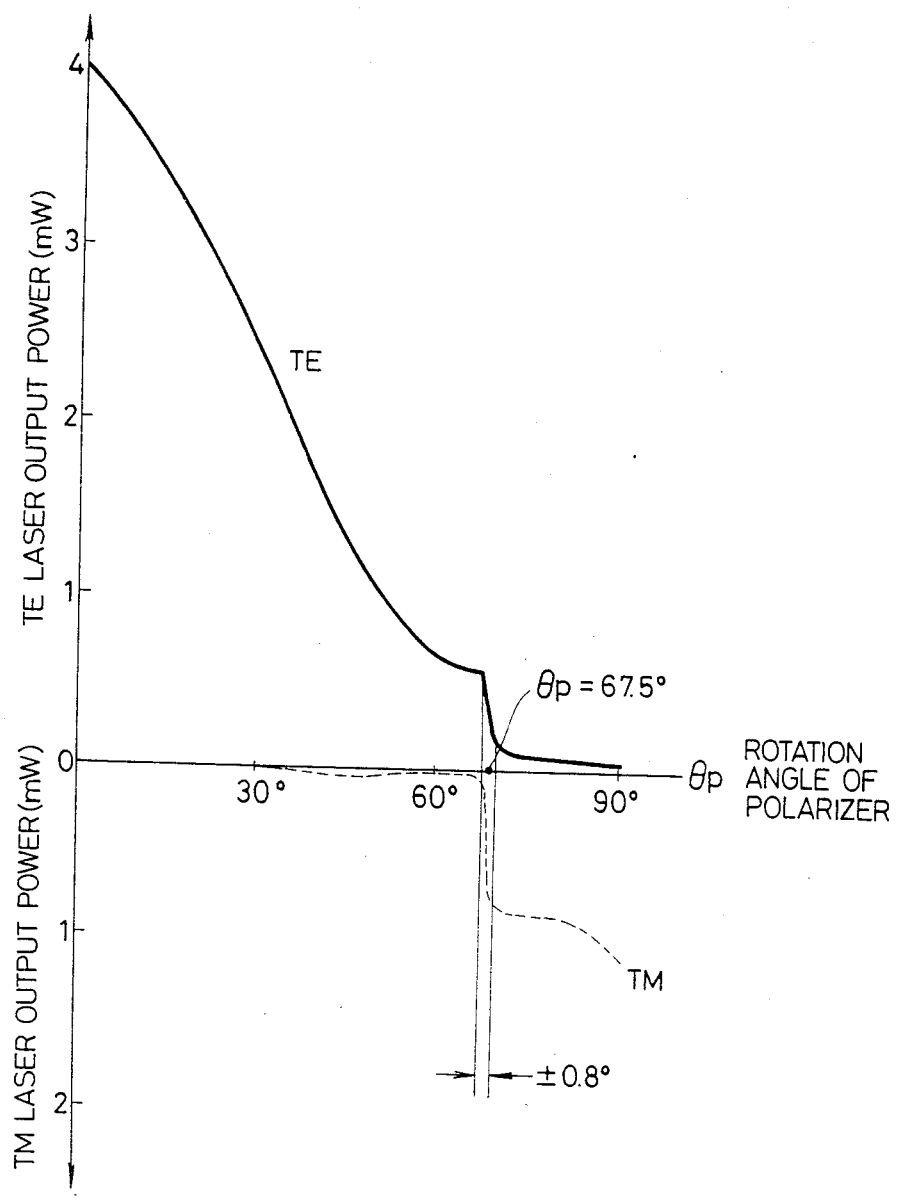
FIG. 3 is a graph illustrating the dependencies of the light intensity in terms of TE polarization laser output power and TM polarization laser output power upon the rotation angle of the polarizer ($\theta_p$) for explaining the principle of the present invention.

FIG. 3 illustrates the dependencies of the light intensities of the TE polarization and TM polarization upon the rotation angle of the polarizer ($\theta_p$) in the case where the laser driving current is fixed at a constant value. These characteristics have been measured in such a way that, in the arrangement of FIG. 1, the backward emergent light B of the semiconducor laser 10 is condensed by a coupling lens, whereupon the backward emergent light passing through an analyzer (linear polarizer), the polarization transmitting plane of which is set to be parallel or perpendicular to the junction of the semiconductor laser 10, is received by a photodetector. As apparent from the figure, the oscillating polarization direction changes by nearly 90° from the TE mode to the TM mode in a very narrow angular range in the vicinity of $\theta_p = 67.5°$. In other words, the intensity of the TM polarization increases from about 0 to about 1 mW on the basis of the rotation of the polarizer through an angular range of ±0.8°.

The present invention applies this phenomenon to the reproduction of information from a magneto-optical storage medium so as to reproduce the stored information with a high S/N ratio. The present invention will now be described with reference to the embodiments of FIGS. 4-6.

Figure 4:
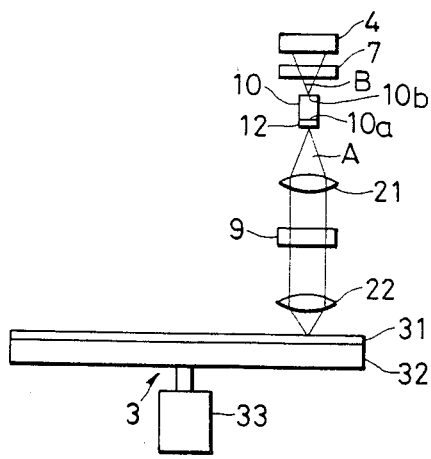
FIG. 4 illustrates an arrangement in accordance with one embodiment of the present invention.

FIG. 4 illustrates an example of a reproducing system with a magneto-optical disk memory according to the present invention wherein like reference numerals are utilized with like parts. A magneto-optical disk 3 (hereinbelow, simply termed "disk") consists of a disk substrate 32 and a layer of magnetically anisotropic medium 31 disposed on the substrate 32. The recording and erasure of information are carried out in such a way that a magnetic field is applied perpendicularly to the magnetically anisotropic medium layer 31 of the disk 3, to form residual magnetization in the thickness direction of the disk, and that a laser beam is condensed to heat a part irradiated therewith, the part being subsequently cooled, whereby the direction of the magnetization of the irradiated part is inverted. Thus, an information signal is written into the magnetically anisotropic medium 31 owing to the difference in the thickness (perpendicular) magnetization direction. Various types of magnetically anisotropic media such as GdCo, TbFe, MnBi, etc. are known and can be effectively utilized herein as the medium 31.

In FIG. 4, forward emergent light A from one facet 10a of a semiconductor laser 10 having a buried heterostructure is collimated by a coupling lens 21, and the collimated beam is condensed by an objective lens 22 onto the magnetically anisotropic medium layer 31 of the disk 3 which is rotated by a motor 33. The projected light falling on the disk 3 has its polarization plane rotated slightly to the right or the left, depending upon whether the magnetization direction of the magnetically anisotropic medium layer 31 is upward or downward. Thereafter, the light is reflected from the disk. The reflected light returns along the same optical path as that of the projected light, to be fed back to the emergent facet 10a of the laser 10. In the apparatus of the present embodiment, a Faraday rotator (hereinbelow, simply termed "rotator") 9 is inserted between the two lenses 21 and 22, and the facet 10a of the laser 10 is provided with an, antireflection coating 12. The rotator 9 may be a device which changes by an external magnetic field intensity, a device of optically-transparent ferromagnetic material in which the polarization rotating angle thereof is adjusted by the thickness of the material, or a like device. The use of an optically-transparent ferromagnetic material as the rotator is desirable since such a material enables the apparatus to be small in size and light in weight as well as having low loss. Various optically-transparent ferromagnetic materials such as $Y_3Fe_5O_{12}$ (YIG), $Gd_2BiFe_5O_{12}$, etc., can be effectively utilized. Herein, a sheet of YIG having a thickness of 0.5 mm (which corresponds to a polarization rotation angle $\theta_F = 34°$ to be described later) and a transmission factor of 0.22 is employed for a wavelength of 0.8 μm of the semiconductor laser 10. The antireflection coating 12 may be, for example, $SiO_2$ which is deposited to a thickness of ¼ of the wavelength of the semiconductor laser 10 by sputtering or the like.

The laser 10 provides a backward emergent laser beam B from the facet 10b thereof and only a polraization component in a specified direction is extracted by an analyzer 7 (linear polarizer in the present invention) which is arranged behind the laser. The polarization component which is extracted is led to a photodetector 4 which provides an electrical output signal in accordance therewith. The rotator 9 is provided with a predetermined thickness so that the polarization rotation angle $\theta_F$ of the rotator is set at approximtely ½ of the central angle of the region in which the oscillating polarization direction of the semiconductor laser 10 changes from the TE mode to the TM mode. Thus, the light entering the disk 3 is linearly polarized in a direction rotated $\theta_F$ from the TE direction, while the light reflected from the disk 3 is linearly polarized in the direction of $\theta_F \pm \Delta\theta$ (where $\Delta\theta > 0$), depending upon the sense of the magnetization of the magnetically anisotropic medium layer 31. When the reflected light passes through the rotator 9 to enter the facet 10a of the laser 10 again, the polarization direction becomes 2 $\theta_F \pm \Delta\theta$. In accordance with the foregoing principle, the TM polarization oscillation takes place when the polarization of 2 $\theta_F + \Delta\theta$ has returned to the laser, while the TE polarization oscillation takes place when the polarization of 2 $\theta_F - \Delta\theta$ has returned. Accordingly, the slight rotation $\Delta\theta$ of the polarization plane by the magnetization of the magnetically anisotropic medium layer 31 rotates the polarization plane of the laser oscillation beam of the semiconductor laser 10 nearly 90°. When the polarization transmitting plane of the analyzer 7 is set at the direction perpendicular to the junction plane of the laser device 10 so as to pass only the TM polarization, light having a signal level of about 1 mW enters the photodetector 4 as with respect to FIG. 3, and the signal level is increased, at least, by about an order of two as compared with that of the prior art. It is, of course, possible to set the polarization transmitting plane of the analyzer in a direction parallel to the junction plane of the laser device 10 as as to pass only the TE polarization.

As described above, the TE mode is perfectly changed to the TM mode by $\Delta\theta$. The invention, however, is also applicable to a case where the TE mode is not perfectly changed to the TM mode by rotating the polarization plane of the backward emergent light by $\Delta\theta$. However, even in this case, a satisfactory S/N ratio can be ensured.

Figure 5:
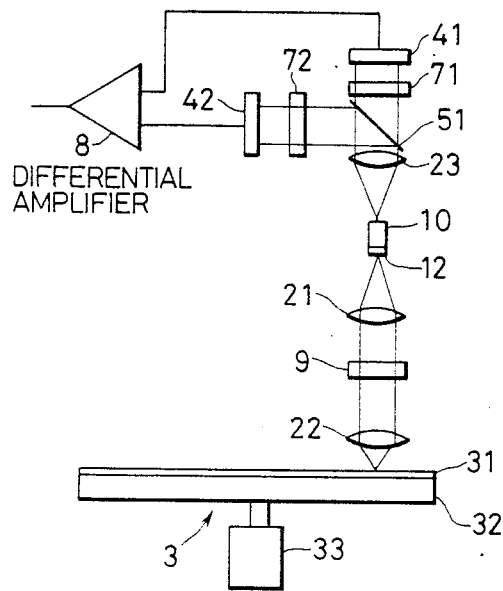
FIG. 5 illustrates an arrangement in accordance with another embodiment of the present invention.

FIG. 5 shows another embodiment of the present invention. The apparatus of this embodiment is arranged so that a backward emergent laser beam is split in two by a transparent mirror 51, and analyzers 71 and 72 are utilized, one of which has its polarization transmitting plane set to be in parallel with the junction plane of the laser device 10 so as to take out the TE polarization and the other of which has its polarization transmitting plane set to be perpendicular to the junction plane so as to take out the the TM polarization. In this embodiment, the TE and TM polarizations are, respectively, introduced into the photodetectors 41 and 42 and the outputs thereof are differentially amplified by a different amplifier 8. With the apparatus of the present embodiment, accordingly, the signal level is doubled, and simultaneously, noise such as laser noise and disk surface noise are cancelled, whereby the S/N ratio can be enhanced more. Needless to say, the semitransparent mirror 51 and the analyzers 71, 72 may be replaced with a polarization prism which transmits the TE polarization and which reflects the TM polarization so as to direct the appropriate polarization onto the corresponding photodetector.

Figure 6:
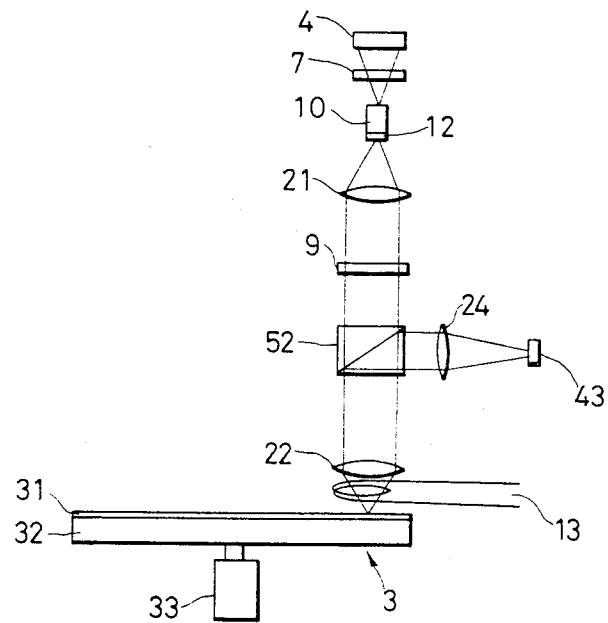
FIG. 6 illustrates an arrangement in accordance with a further embodiment of the present invention.

FIG. 6 shows still another embodiment of the present invention, in which a focusing deviation and tracking deviation-detecting optical system is included for the recording and erasing functions. The recording and erasure of information in a magneto-optical storage medium are carried out by a thermomagnetic recording and erasing process wherein a light spot is projected under an external magnetic field perpendicular to the storage medium. A coil 13 is interposed between the objective lens 22 and the disk 3 in a manner so as to surround a laser beam. The coil 13 is supplied with current from a power source, not shown, to generate the magnetic field which is perpendicular to the disk 3.

Numeral 43 designates a photodetector for detecting a focusing deviation and a tracking deviation, numeral 52 designates a beam splitter such as semitransparent prism which splits light reflected from the disk in two so as to lead one of them to the photodetector 43, and numeral 24 a cylindrical lens which serves to detect the focusing deviation. These parts constitute a focusing deviation and tracking deviation-detecting optical system and are utilizable therefor in accordance with the known techniques of focusing and tracking deviation in non-erasable optical disk memory devices such as optical video disks and optical audio disks.

In the foregoing three embodiments, a sheet of YIG is utilized as the rotator 9, and its thickness is set at 0.5 mm so that the polarization rotating angle $\theta_F$ thereof may become 34° for the case where the transition from the TE polarization to the TM polarization takes place at the polarizer rotation angle $\theta_p=67.5°$. In order to attain the same polarization rotating angle by the use of a sheet of $Gd_2BiFe_{15}O_{12}$, the thickness of the sheet becomes 0.043 mm. The transmission factor in this case becomes 0.68.

The polarization rotating angle at which the oscillating polarization direction of the semiconductor laser differs depending upon the structure of the semiconductor laser to be used. Thus, the above description is merely exemplary and the present invention should not be considered to be limited to the disclosed embodiments.

As set forth above, according to the present invention, a slight rotation of a polarization plane by the magnetization of a storage medium can be amplified to the rotation of the polarization plane of a semiconductor laser nearly equal to 90°. This brings forth the remarkable effect that an optical information reproducing appratus which can reproduce information from a magneto-optical disk at a high S/N ratio can be obtained.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. An optical information storage system comprising laser means for generating a first laser beam, magnetic storage means arranged for being irradiated by the first laser beam and for reflecting light of the first laser beam therefrom, the magnetic storage means enabling recording of information by a change in the magnetic direction thereof, the light reflected from the magnetic storage means being indicative of the information recorded on the magnetic storage means, the laser means being responsive to the light reflected from the magnetic storage means for generating a second laser beam, photodetection means being responsive to the second laser beam for providing an output signal in accordance therewith, rotation means arranged in an optical path along which the light reflected from the magnetic storage means returns to the laser means for modifying the light reflected from the magnetic storage means in accordance with a predetermined polarization rotating angle thereof, the rotation means having the predetermined rotating angle selected so that a polarization plane of the second laser beam is changeable in dependence upon the magnetized direction of the information of the magnetic storage means, and analyzer means interposed between the laser means and the photodetection means for extracting at least one polarization component from the second laser beam, the photodetection means being responsive to the at least one extracted polarization component for providing an output signal indicative of the information recorded on the magnetic storage means.

2. An optical information storage system according to claim 1, wherein the laser means is a semiconductor laser means having a junction plane, the semiconductor laser means utilizing self-coupling for generating the second laser beam in response to the light reflected from the magnetic storage means.

3. An optical information storage system according to claim 2, wherein the magnetic storage means includes a magnetically anisotropic storage medium.

4. An optical information storage system according to claim 3, wherein the analyzer means extracts from the second laser beam at least one of a polarization component parallel to and perpendicular to the junction plane of the semiconductor laser means.

5. An optical information storage system according to claim 4, wherein the rotator means includes a Faraday rotator.

6. An optical information storage system according to claim 4, wherein the rotator means is arranged in an optical path along which the first laser beam irradiates the magnetic storage means.

7. An optical information storage system according to claim 4, wherein the rotator means comprises an optically-transparent ferromagnetic material.

8. An optical information storage system according to claim 7, wherein the optically-transparent ferromagnetic material is a material selected from the group consisting of $Y_3Fe_5O_{12}$ and $Gd_2BiFe_5O_{12}$.

9. An optical information storage system according to claim 4, wherein said semiconductor laser means comprises a buried-heterostructure semiconductor laser having a facet for emitting the first laser beam, and an antireflection coating being provided on the facet emitting the first laser beam.

10. An optical information storage system according to claim 9, wherein the semiconductor laser includes another facet for emitting the second laser beam.

11. An optical information storage system according to claim 4, wherein the analyzer means includes a linear polarizer having a polarization transmitting plane arranged perpendicular to the junction plane of the semiconductor laser means.

12. An optical information storage system according to claim 4, wherein the analyzer means includes a linear polarizer having a polarization transmitting plane arranged parallel to the junction plane of the semiconductor laser means.

13. An optical information storage system according to claim 4, wherein the analyzer means includes polarization prism means for extracting the polarization components parallel and perpendicular to the junction plane of the semiconductor laser means.

14. An optical information storage system according to claim 13, wherein the photodetection means comprises a first photodetector means responsive to the parallel polarization component for providing an output signal in accordance therewith and a second photodetector means responsive to the perpendicular vertical polarization component for providing an output signal in accordance therewith.

15. An optical information storage system according to claim 14, further comprising means responsive to the output signals of the first and second photodetector means for providing an output signal in accordance with the difference therebetween.

16. An optical information storage system according to claim 4, wherein the analyzer means comprises beam splitter means for splitting the second laser beam into two split laser beams, a first linear polarizer for extracting from one of the split laser beams a polarization component parallel to the junction plane of the semiconductor laser means, and a second linear polarizer for extracting from the other of the split laser beams a polarization component perpendicular to the junction plane of the semiconductor laser means.

17. An optical information storage system according to claim 16, wherein the photodetection means incudes a first photodetector means responsive to the extracted polarization component from the first linear polarizer for providing an output signal in accordance therewith, and a second photodetector means responsive to the extracted polarization component from the second linear polarizer for providing an output signal in accordance therewith.

18. An optical information storage system according to claim 17, further comprising means responsive to the output signals from the first and second photodetector means for providing an output signal in accordance with the difference therebetween 19. An optical information storage system according to claim 4, further comprising means for detecting at least one of a focusing and tracking deviation, the focusing and tracking deviation means including beam splitter means arranged in the optical path along which the light reflected from the magnetic storage means returns to the semiconductor laser means for splitting the reflected light into two beams, one of the two beams being received by the semiconductor laser means and the other of the two beams being received by the focusing and tracking deviation means, the focusing and tracking deviation means being responsive to the other of the two beams for providing an output signal in accordance therewith.

20. An optical information storage system according to claim 4, further comprising magnetic field generating means for generating a magnetic field for at least one of recording information and erasing information from the magnetic storage means, the reflected light from the magnetic storage means being indicative of the information stored in the magnetic storage means.

* * * * *